(12) United States Patent
Seyr et al.

(10) Patent No.: US 11,098,385 B2
(45) Date of Patent: Aug. 24, 2021

(54) METHOD FOR PRODUCING ROLLER-FORMED, PARTIALLY HARDENED PROFILES

(71) Applicant: voestalpine Krems GmbH, Krems (AT)

(72) Inventors: Alfred Seyr, Statzendorf (AT); Christian Rouet, Gedersdorf (AT)

(73) Assignee: VOESTALPINE KREMS GMBH, Krems (AT)

( * ) Notice: Subject to any disclaimer, the term of this patent is extended or adjusted under 35 U.S.C. 154(b) by 469 days.

(21) Appl. No.: 15/769,898

(22) PCT Filed: Oct. 12, 2016

(86) PCT No.: PCT/EP2016/074402
§ 371 (c)(1),
(2) Date: Apr. 20, 2018

(87) PCT Pub. No.: WO2017/067827
PCT Pub. Date: Apr. 27, 2017

(65) Prior Publication Data
US 2018/0305782 A1 Oct. 25, 2018

(30) Foreign Application Priority Data
Oct. 21, 2015 (EP) .................................. 15190867

(51) Int. Cl.
*C21D 9/00* (2006.01)
*B21D 5/00* (2006.01)
(Continued)

(52) U.S. Cl.
CPC .......... *C21D 9/0068* (2013.01); *B21D 5/008* (2013.01); *B21D 5/08* (2013.01); *C21D 7/13* (2013.01);
(Continued)

(58) Field of Classification Search
CPC ................................ C21D 9/0068; C21D 8/00
(Continued)

(56) References Cited

U.S. PATENT DOCUMENTS 8,480,824 B2 7/2013 Cola et al.
2010/0156143 A1* 6/2010 Gucker ............... C21D 9/0068
296/187.03
(Continued)

FOREIGN PATENT DOCUMENTS

CN 103069019 A * 4/2013 ............. B21D 5/008
DE 10120063 C2 3/2003
(Continued)

OTHER PUBLICATIONS

CN-103069019-A English Translation (Year: 2013).*
(Continued)

*Primary Examiner* — Coris Fung
*Assistant Examiner* — Danielle Carda
(74) *Attorney, Agent, or Firm* — Tarolli, Sundheim, Covell & Tummino LLP

(57) ABSTRACT

The invention relates to a method for continuously roller-forming and hardening sheet steel in which a sheet steel strip is continuously roller-formed into a profile in a roller-profiling unit, characterized in that the roller-formed profile strand is preheated to a temperature below the austenite starting temperature ($Ac_1$) and the roller-formed profile strand is then heated across subregions of its cross-section and/or subregions of its length to a temperature above $AC_3$, with the roller-formed profile strand being acted on with tension at least during the heating of subregions to a temperature $>AC_3$.

14 Claims, 11 Drawing Sheets

Figure 1:
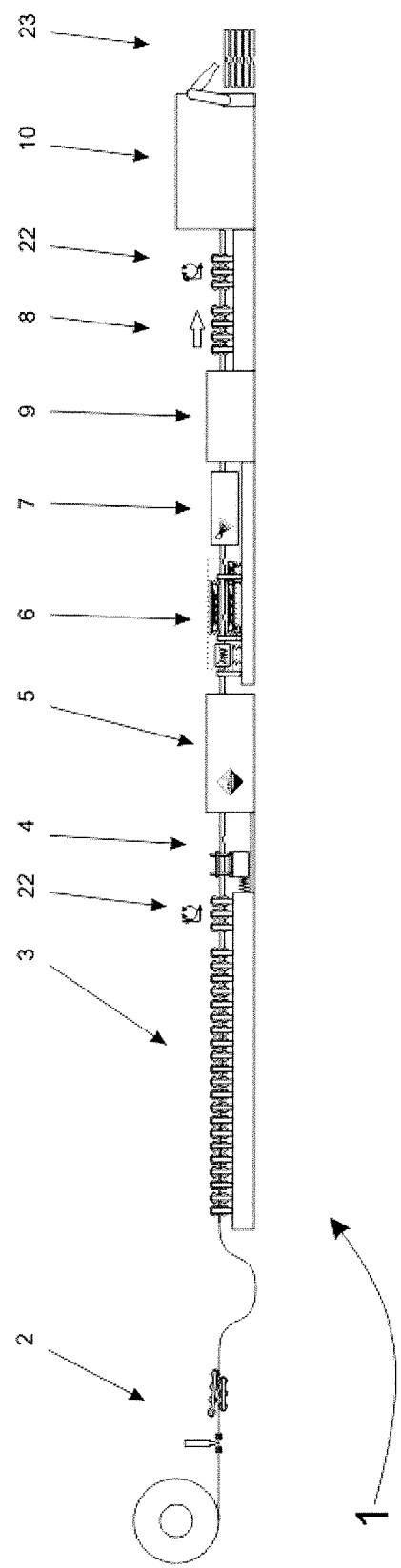

(51) Int. Cl.
   *B21D 5/08* (2006.01)
   *C21D 7/13* (2006.01)
   *C21D 8/02* (2006.01)
   *C21D 9/52* (2006.01)
   *C21D 8/00* (2006.01)
   *B32B 15/01* (2006.01)

(52) U.S. Cl.
   CPC ............. *C21D 8/00* (2013.01); *C21D 8/0226* (2013.01); *C21D 9/52* (2013.01); *B32B 15/013* (2013.01); *C21D 8/005* (2013.01); *C21D 2211/001* (2013.01); *C21D 2221/00* (2013.01)

(58) Field of Classification Search
   USPC .......................................................... 148/533
   See application file for complete search history.

(56) References Cited

U.S. PATENT DOCUMENTS

| 2010/0263424 | A1* | 10/2010 | Madhavan | ............. | B21D 11/02 |
| | | | | | 72/166 |
| 2011/0011499 | A1* | 1/2011 | Lengauer | ................ | C21D 1/10 |
| | | | | | 148/526 |

FOREIGN PATENT DOCUMENTS

| DE | 102007024797 A1 | 11/2008 | |
| DE | 102010035195 A1 | 3/2012 | |
| DE | 102011107561 A1 | 1/2013 | |
| EP | 0575411 A1 | 12/1993 | |
| WO | WO-9216665 A1 * | 10/1992 | ............... C21D 9/60 |
| WO | 2009033527 A1 | 3/2009 | |

OTHER PUBLICATIONS

NPL Rolling of Metals (Year: 2015).*
Wikipedia:About-Wikipedia, the free encyclopedia http://en.wikipedia.org/wiki/Wikipedia:About (Year: 2012).*
International Search Report and Written Opinion dated Jan. 18, 2017 for corresponding International Application No. PCT/EP2016/074402 (in English and German).
European Search Report dated Apr. 11, 2016 for corresponding European Application No. 15190867.0.
"The Cooling Rate of Metal in Air. Workpiece Cooling", Graphics, Apr. 17, 2020, available at: https://avtopilot-center.ru/en/skorost-ohlazhdeniya-metalla-na-vozduhe-ohlazhdenie-zagotovok-naznachenie.html (last accessed Sep. 24, 2020).

* cited by examiner

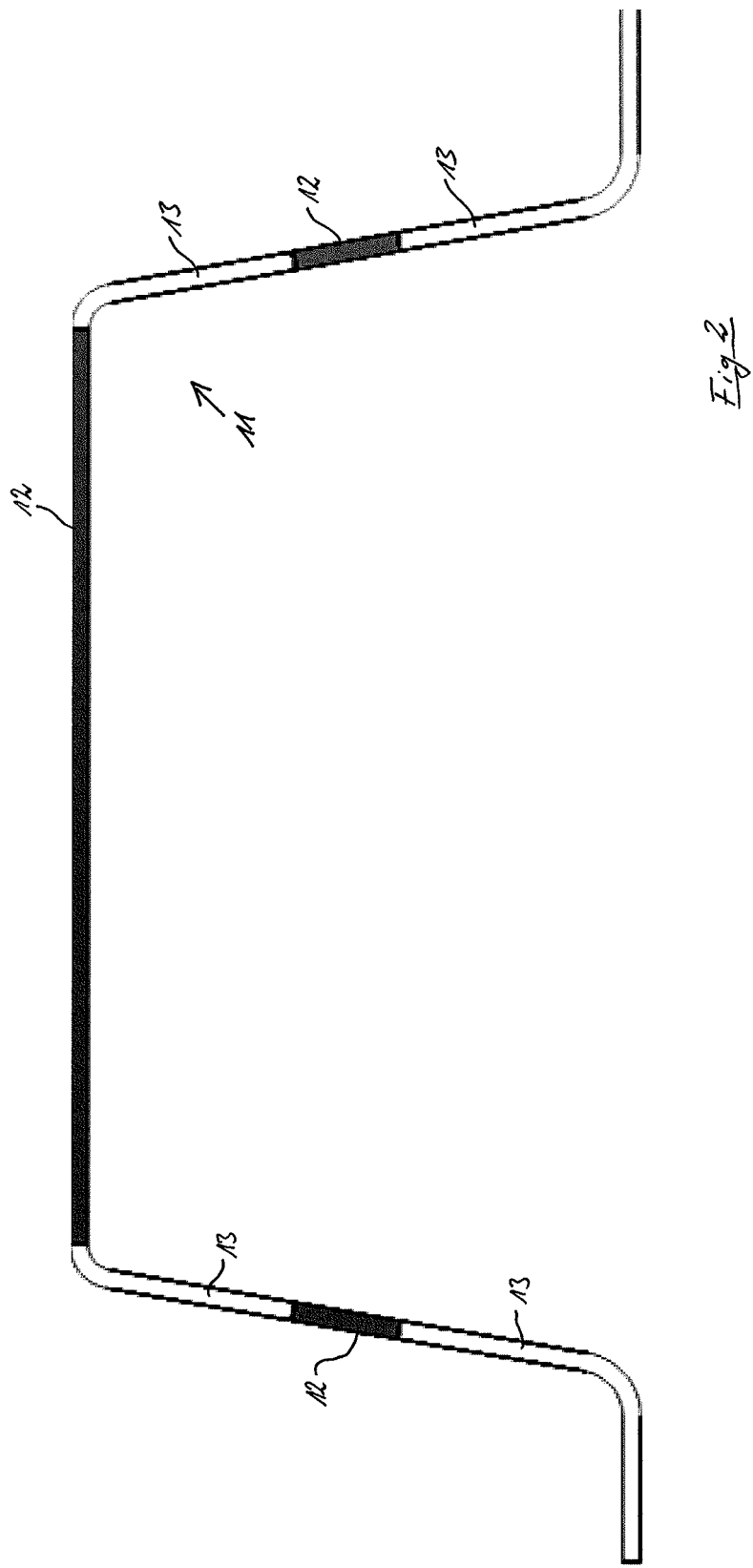

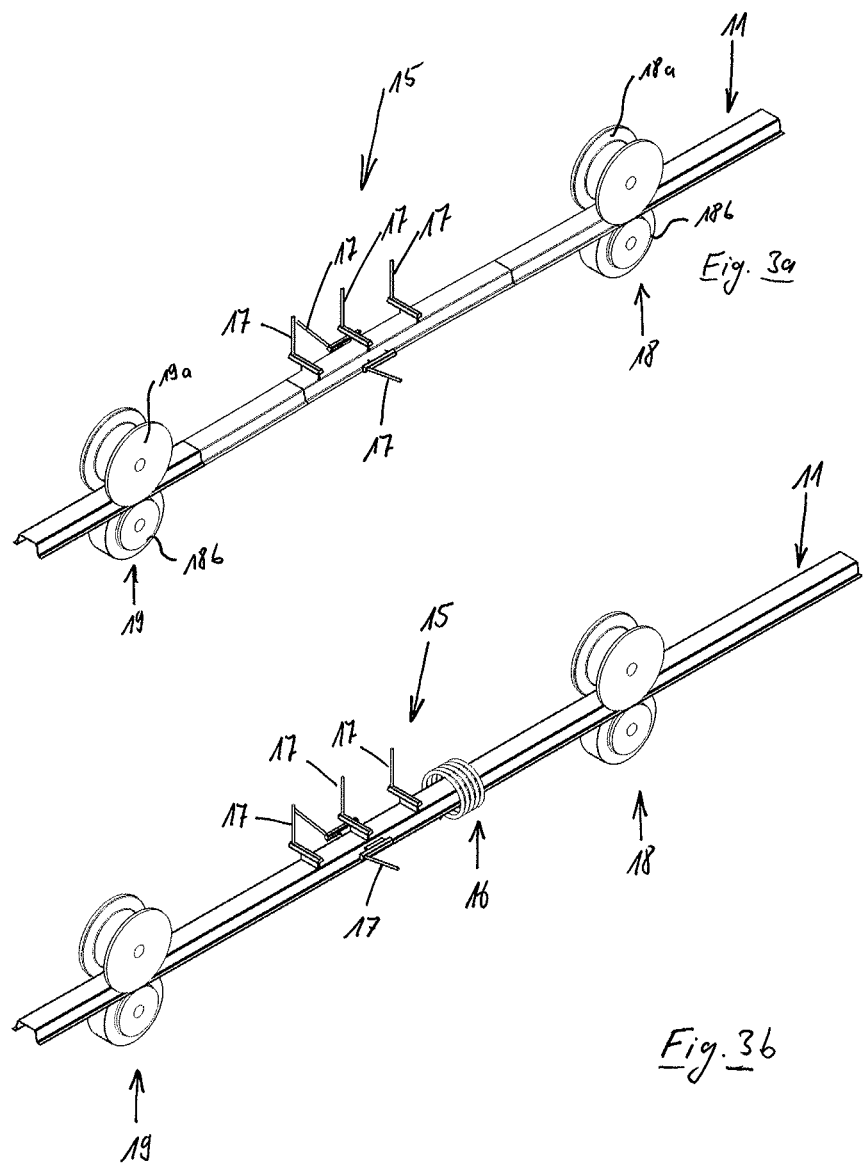

METHOD FOR PRODUCING ROLLER-FORMED, PARTIALLY HARDENED PROFILES

RELATED APPLICATIONS

The present application is a U.S. National Stage application under 35 USC 371 of PCT Application Serial No. PCT/EP2016/074402, filed on 12 Oct. 2016; which claims priority from GB Patent Application No. 15190867.0, filed 21 Oct. 2015, the entirety of both of which are incorporated herein by reference.

The invention relates to a method for producing roller-formed, partially hardened profiles according to the preamble to claim 1.

The roller-forming of metal profiles is a technique that is known per se. In roller profiling, usually continuously flat sheet metal strips are guided through a plurality of roller frames and are deformed or shaped in the process. This can be used to produce a plurality of different cross-sections, from simple cylindrical pipes to more complex pipe geometries.

Usually, pipes of this kind are then welded longitudinally in the abutting region so as to produce closed structures. But open profiles are also frequently produced by means of roller profiling.

EP 1 660 693 B1 has disclosed a method for producing a hardened profile component from a hardenable steel alloy with a cathodic corrosion protection; a sheet steel strip provided with a zinc or zinc alloy coating is roller profiled and the coated sheet steel is then brought to an austenitizing temperature and then cooled so that it hardens; the profile strand is cut to length into profile strand sections before or after the hardening and before it is profiled and cut to length, is provided with holes, openings, stamped perforations, and the like.

The object of U.S. Pat. No. 6,564,604 B2 is to provide sheet steels that then undergo a heat treatment and to provide a method for producing parts by press hardening these coated sheet steels. In this case, despite the increase in temperature, the goal is to ensure that before, during, and after the hot pressing or heat treatment, the sheet steel does not decarbonize and that the surface of the sheet steel does not oxidize. For this purpose, an alloyed intermetallic mixture should be deposited onto the surface before or after the stamping, which should provide a protection from corrosion and decarbonization and can also offer a lubricating function. In one embodiment, this reference proposes using a conventional zinc layer, which clearly deposited in electrolytic fashion; in a subsequent austenitization of the sheet steel substrate, this zinc layer and the steel substrate should transform into a homogeneous Zn/Fe alloy layer. This homogeneous layer structure is covered with microscopic recesses. Contrary to prior assumptions, this coating should have a mechanical resistance that protects it from melting. Such an effect is not exhibited in practice, though. In addition, the use of zinc or zinc alloys should offer a cathodic protection of the edges if cuts are present. In this embodiment, though, it is disadvantageous that with a coating of this kind—contrary to what is stated in this reference—hardly any cathodic corrosion protection is provided at the edges and if the layer is breached in the region of the face of the sheet steel, only a poor corrosion protection is achieved.

In the second example of U.S. Pat. No. 6,564,604 B2, a coating is disclosed, which is composed of up to 50% to 55% aluminum and 45% to 50% zinc, optionally with small quantities of silicon. A coating of this kind is not novel per se and is known by the brand name Galvalume®. The reference states that the coating metals zinc and aluminum with iron should produce a homogeneous zinc/aluminum/iron alloy coating. This coating has the disadvantage that it no longer achieves a sufficient cathodic corrosion protection, but when used in the press hardening process, most of the barrier protection that is achieved with it is not sufficient because breaches in the surface are inevitable in some regions. In summary, it can be said that the method described in this reference is not able to solve the problem that in general, zinc-based cathodic corrosion-protection coatings are not suitable for protecting sheet steels that are to be subjected to a heat treatment after the coating procedure and may possibly also undergo a further forming or shaping step.

EP 1 013 785 A1 has disclosed a method for producing a sheet steel component; the sheet steel should have an aluminum layer or an aluminum alloy layer on its surface. A sheet steel provided with coatings of this kind is intended to undergo a press-hardening process; possible coating alloys indicated include an alloy with 9-10% silicon, 2-3.5% iron, residual aluminum with impurities and a second alloy with 2-4% iron and residual aluminum with impurities. Coatings of this kind are known per se and correspond to the coating of a hot-dip aluminized sheet steel. A coating of this kind has the disadvantage that it only achieves a so-called barrier protection. The moment such a barrier protection is breached or when cracks occur in the Fe/Al layer, the base material, in this case steel, is attacked and corroded. There is no cathodic protective action.

It is also disadvantageous that when the sheet steel is heated to the austenitizing temperature and during the subsequent press-hardening step, a hot-dip aluminized coating of this kind is subjected to both chemical and mechanical stresses to such an extent that the component that is produced does not have a sufficient corrosion-protection layer. It can therefore be stated that a hot-dip aluminized coating of this kind is not well-suited to the press-hardening of complex geometries, i.e. to the sheet steel being heated to a temperature above the austenitizing temperature.

DE 102 46 614 A1 has disclosed a method for producing a coated structural component for automotive construction. This method should solve the problems of the above-mentioned European patent application 1 013 785 A1. In particular, this reference states that in the dipping process according to European patent application 1 013 785 A1, an intermetallic phase would already form during the coating of the steel; according to this reference, this alloy layer between the steel and the actual coating is hard and brittle and would crack during cold forming. This would result in microcracks to a point that the coating itself detaches from the base material and thus loses its protective function. DE 102 46 614 A1 therefore proposes depositing a coating in the form of a metal or metal alloy by means of a galvanic coating process in an organic, non-aqueous solution, a particularly well-suited and therefore preferred coating material being aluminum or an aluminum alloy. Alternatively, zinc or zinc alloys would also be suitable. A sheet steel coated in this way can then be cold-formed and be hot-formed into the final shape. This method, however, has the disadvantage that an aluminum coating, even if it has been deposited electrolytically, does not provide corrosion protection any more if it is breached because this ruptures the protective barrier. An electrolytically deposited zinc coating has the disadvantage that with the heating for the hot-forming, the majority of the zinc oxidizes and is no longer available for a cathodic protection. In a protective atmosphere, the zinc evaporates.

DE 101 20 063 C2 has disclosed a method for producing metallic profile components for motor vehicles. In this known method for producing metallic profile components for motor vehicles, raw material that is provided in strip form is conveyed to a roller profiling unit and formed into a rolled profile. After exiting the roller profiling unit, at least some regions of the rolled profile are inductively heated to a temperature that is required for the hardening and then quenched in a cooling unit. After this, the rolled profiles are cut to length to produce the profile components. One particular advantage of the roller profiling can be seen in the low production costs due to the high processing speed and low tool costs in comparison to a press die. A particular heat-treatable steel is used for the profile component. According to one alternative of this method, some areas of the raw material can be inductively heated to a temperature that is required for the hardening even before entering into the roller profiling unit and can be quenched in a cooling unit before the rolled profile is cut to length. The second alternative has the disadvantage that the cutting to length must take place in the already hardened state, which is problematic give the high hardness of the material. It is also disadvantageous that in the above-described prior art, the profile components that are cut to length must be cleaned and descaled and after the descaling, an individual-piece corrosion-protection coating must be applied; individual-piece corrosion-protection coatings of this kind usually do not provide a very good cathodic corrosion protection.

PCT/EP2008/006214 has likewise disclosed a method for producing hardened profile components; these profile components are roller formed and are inductively heated for hardening purposes. In order to achieve different hardnesses in different regions of the component, in the regions that are to have a higher hardness, a plurality of edges or beads are produced. In particular, openings are punched into the sheet steel, e.g. also in a grid pattern since during inductive heating processes, the regions that are situated at the edge of openings or adjacent to beads—i.e. all forms of edges—are heated more intensely and more rapidly than flat sheet steel components. As a result, a high hardness is achieved by means of a material weakening, so to speak.

In all of the methods that have been known up to this point, it has not been possible to achieve a partial heating of such a component and a partial hardening so that the component does not warp. At the very least, this has not been possible in a continuous process so that methods of this kind could not be carried out in roller profiling systems or could only be carried out subsequently for components that had already been cut to length.

The object of the invention is to create a method that can be successfully used continuously to achieve a hardening in some areas of roller-profiled components, without creating discontinuities or causing warpage.

The object is attained by means of a method with the features of claim 1.

Advantageous modifications are disclosed in the dependent claims that are dependent on claim 1.

With the invention, roller profiled pipe profiles are partially austenitized and hardened; in this context, "partially austenitized and hardened" does not mean—as in conventional methods—austenitizing and hardening the profiles over their entire cross-section and uniformly across the circumference of a partial length of the profile, but instead, only in partial regions of the circumference of the pipe profile, it being possible for these partial circumference regions to extend over the entire length of the profile or only over partial lengths of the profile.

In conventional roller profiling systems, such a partial heating and partial hardening is not successful since a warping of the components occurs, which does not happen in a reproducible fashion either in terms of the thickness or location.

A heating that occurs in only partial regions or is carried out in segmented fashion in terms of the circumference direction of a tubular strand, even over only partial lengths, is produced according to the invention in that a continuously conveyed sheet steel strand that is bent to form a pipe is preheated by means of inductors to a temperature below the austenitizing temperature in the regions in which an austenitization is to be carried out, burners are used to increase the temperature to above the austenitizing temperature, where with a desired hardening over the entire length of a planned component, the burners act in stationary fashion on the region to be hardened on the strand that is being conveyed past or with a heating and hardening over partial lengths, the burners are moved with them in floating fashion and heat only the regions that are to be subsequently hardened.

With these different methods, after the austenitization, a quenching occurs in any case, i.e. a rapid cooling at a speed greater than the critical hardening speed so that in the regions that are to be hardened, an at least partially martensitic structure is produced; in all of the methods, at least in the region of the austenitization, a tension is exerted on the strand so that in the region of the heating, the strand experiences a certain slight amount of lengthening; in particular, the lengthening takes place in the regions that are not heated by the burners and as a result, lengthen due to the thermal expansion.

Exerting tension on the strand, particularly by using roller pairs to exert tension on the strand in the locations where it is not austenitized, therefore compensates for the thermal expansion of the strand in the region in which it is austenitized. This compensation of the thermal expansion results in the fact that these parts do not warp.

According to the invention, any needed holes or cut-outs and any needed cutting to length are performed by laser after the hardening.

Required swaging procedures in the strand are performed by means of floating swaging units, which allows the process to be successfully carried out in continuous fashion.

The invention will be explained by way of example based on the drawings.

Figures 4A, 4B:
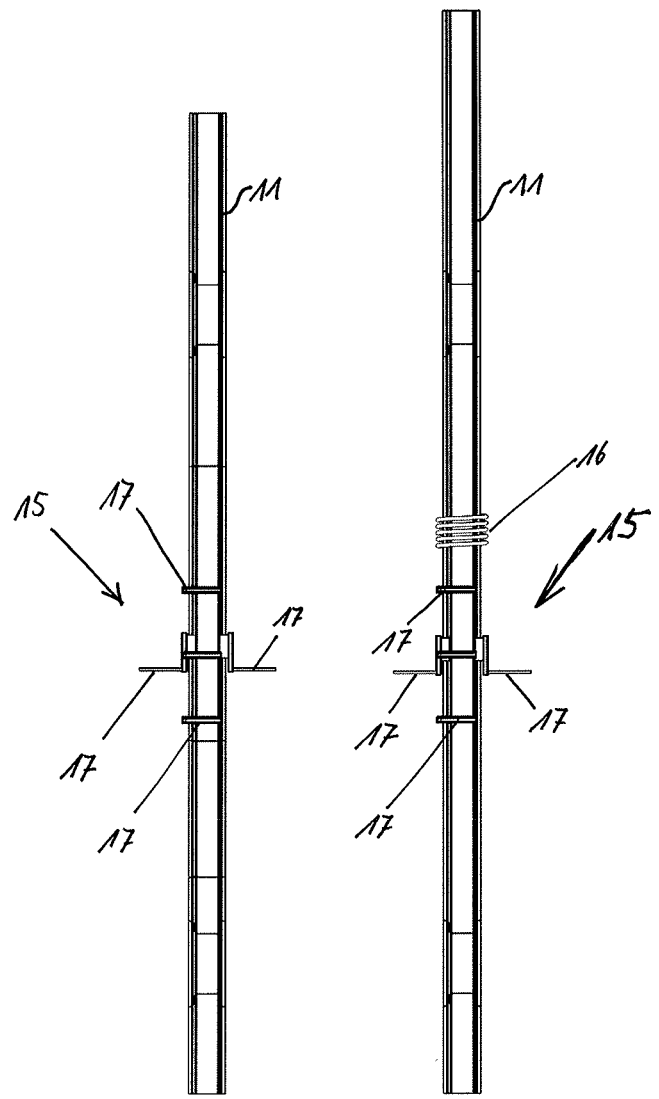
Figure 5:
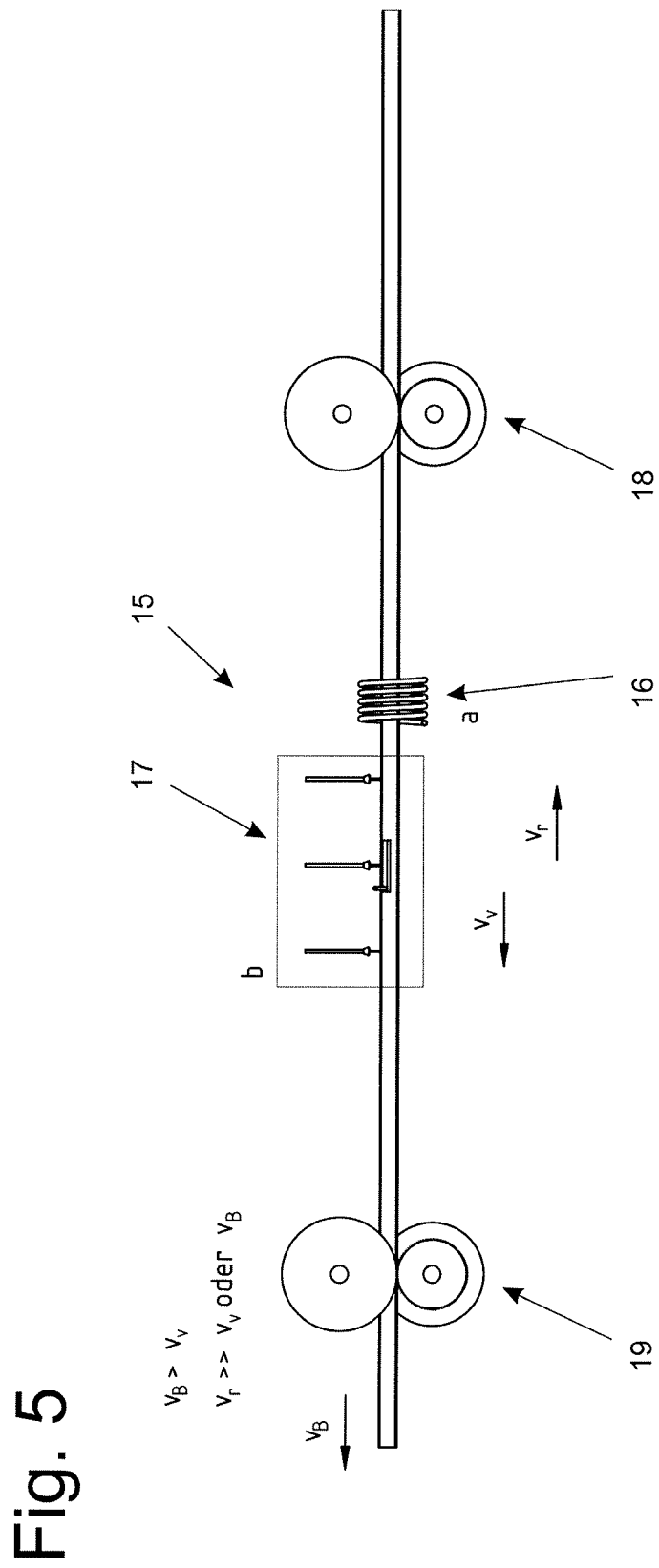
Figure 6:
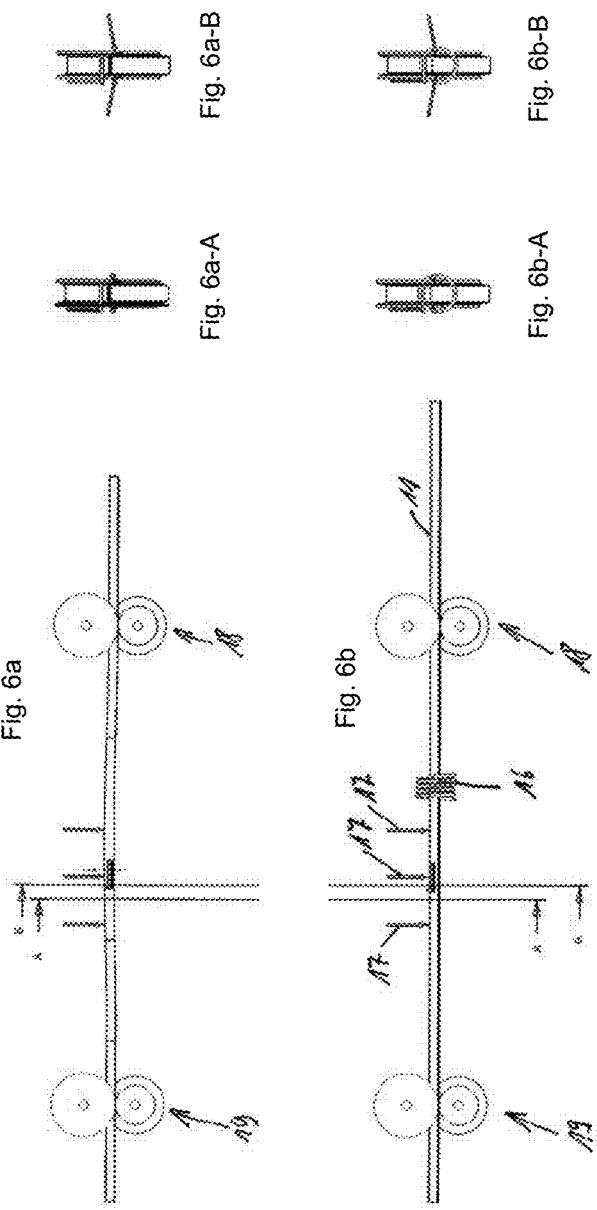

In the drawings:

FIG. 1: shows a system according to the invention for roller profiling with an integrated post-conditioning of the surface;

FIG. 2: is a schematic sectional view of a profile that has been roller profiled and partially hardened with the system according to the invention;

FIG. 3a: is a very schematic view of an apparatus for roller profiling and hardening without compensation for the different length expansion in the regions of differing hardnesses;

FIG. 3b: is a very schematic view of an apparatus for roller profiling and hardening with compensation for the different length expansion in the regions of differing hardnesses;

FIG. 4a: shows the system according to FIG. 3a in a view from below;

FIG. 4b: shows the system according to FIG. 3b in a view from below;

FIG. 5: shows a schematic side view of the apparatus according to the invention according to FIG. 3b, with regions of different hardnesses in the longitudinal direction of the profile; the austenitization stage is conveyed along with the profile whereas the preheating stage is stationary;

FIG. 6a: shows another view of the apparatus according to FIG. 3a without delimitation of the temperature difference in the strip, showing the warpage that results from this;

FIG. 6a-A is a cross-sectional view taken along line A of FIG. 6a.

FIG. 6a-B is a cross-sectional view taken along line B of FIG. 6a.

FIG. 6b: shows another view of the apparatus according to FIG. 3b with an inductor and with delimitation of the temperature difference in the strip, which causes the profile to remain (virtually) free of warpage;

FIG. 6b-A is a cross-sectional view taken along line A of FIG. 6b.

FIG. 6b-B is a cross-sectional view taken along line B of FIG. 6b.

Figure 7:
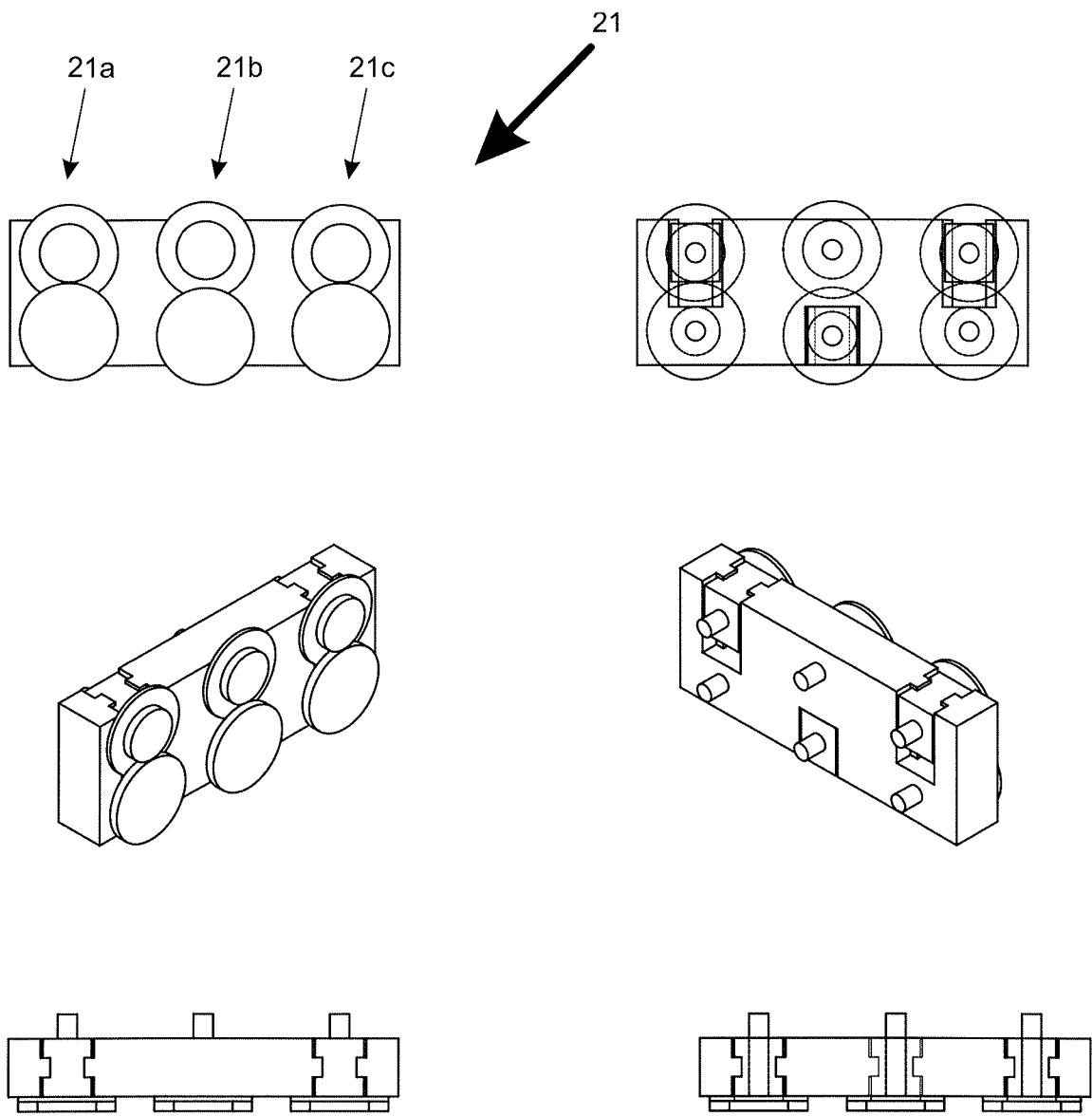
Figure 8:
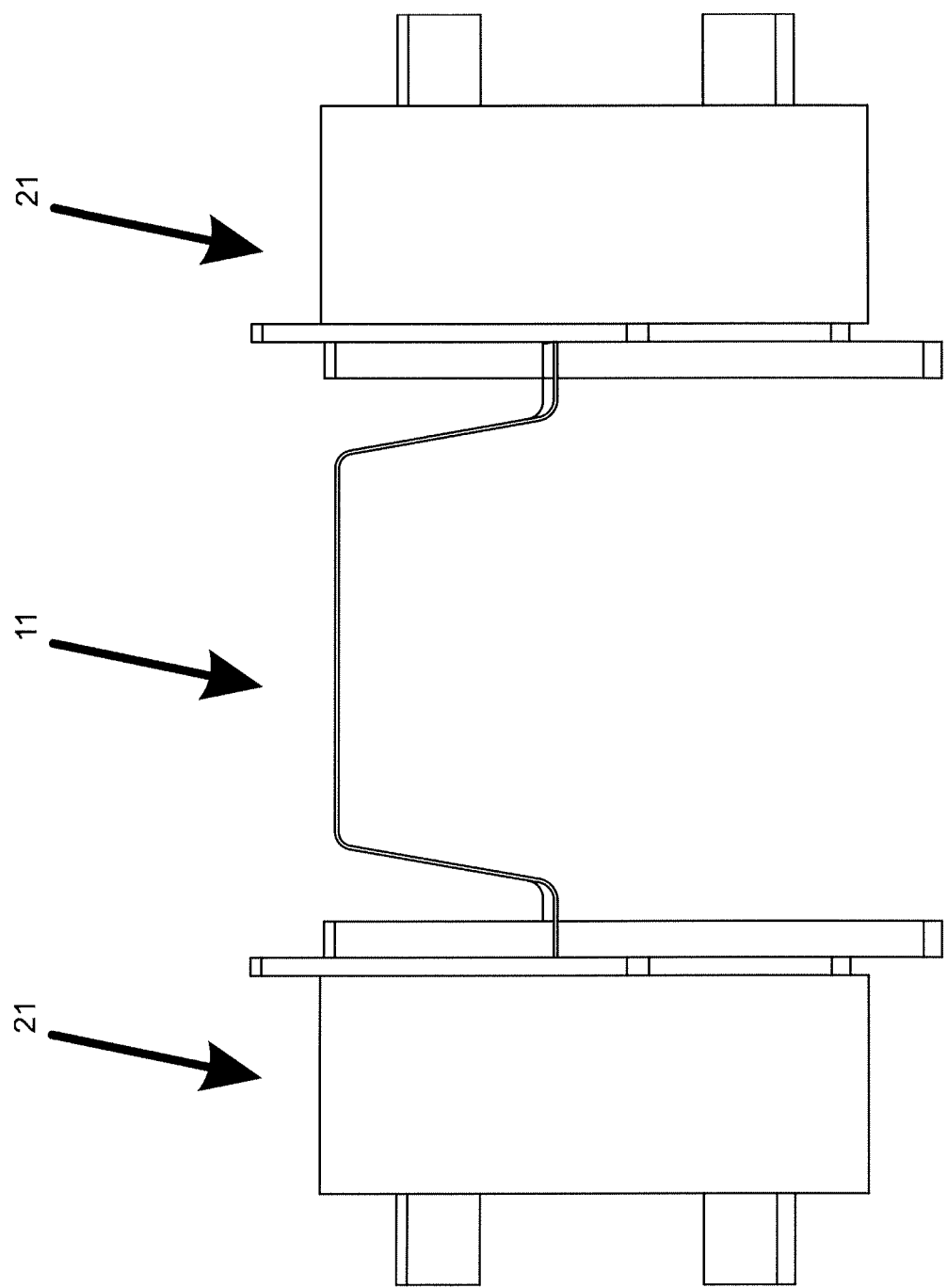
Figure 9:
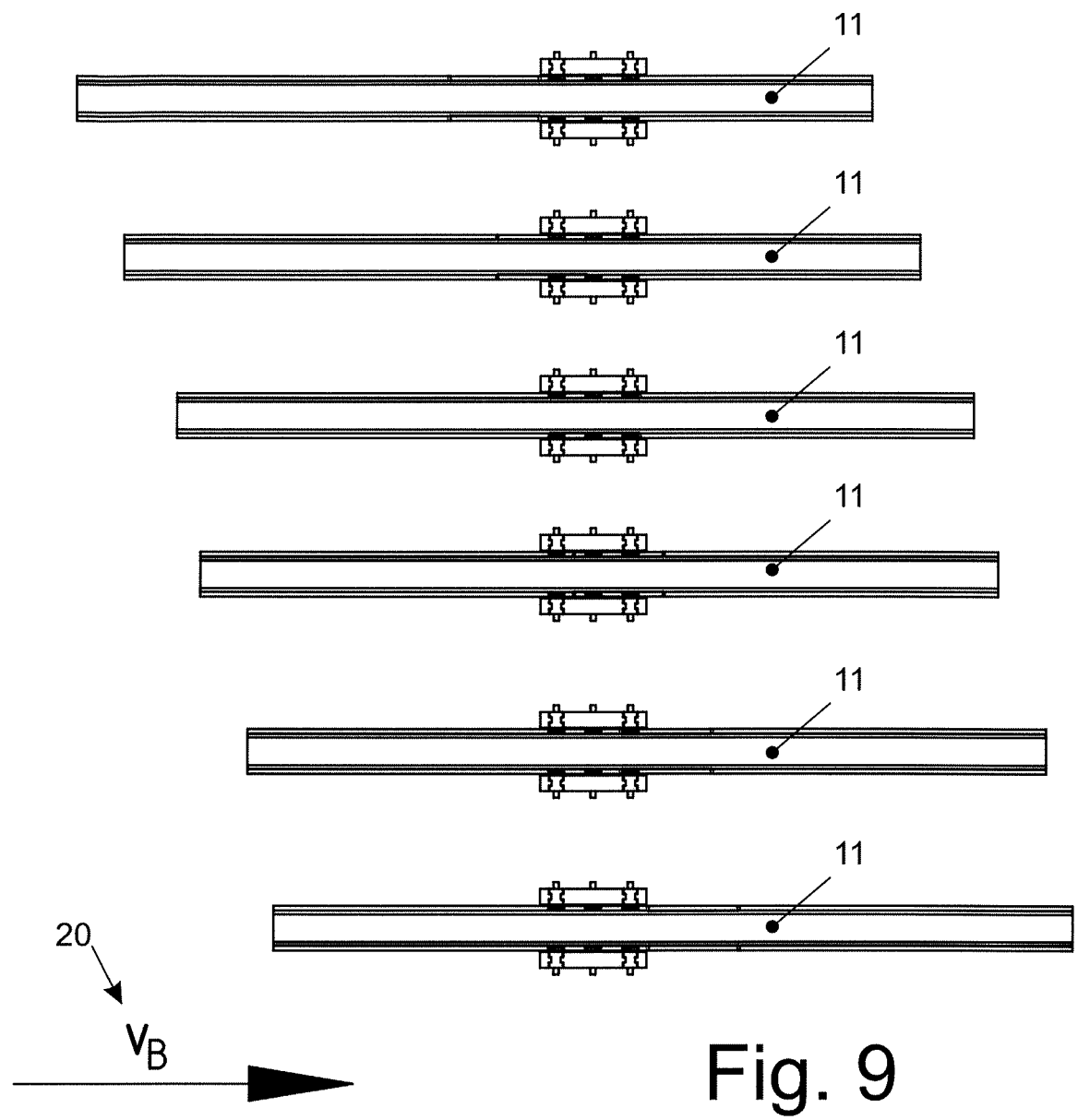

FIG. 7: shows the controlled profile guides for guiding the strip in the heating zone in the regions with swaging;

FIG. 8: is a very schematic depiction of the arrangement according to FIG. 7, which engages the swaged flanges of a profile;

FIG. 9: shows a top view of a profile in different stages of its transport; and

Figure 10:
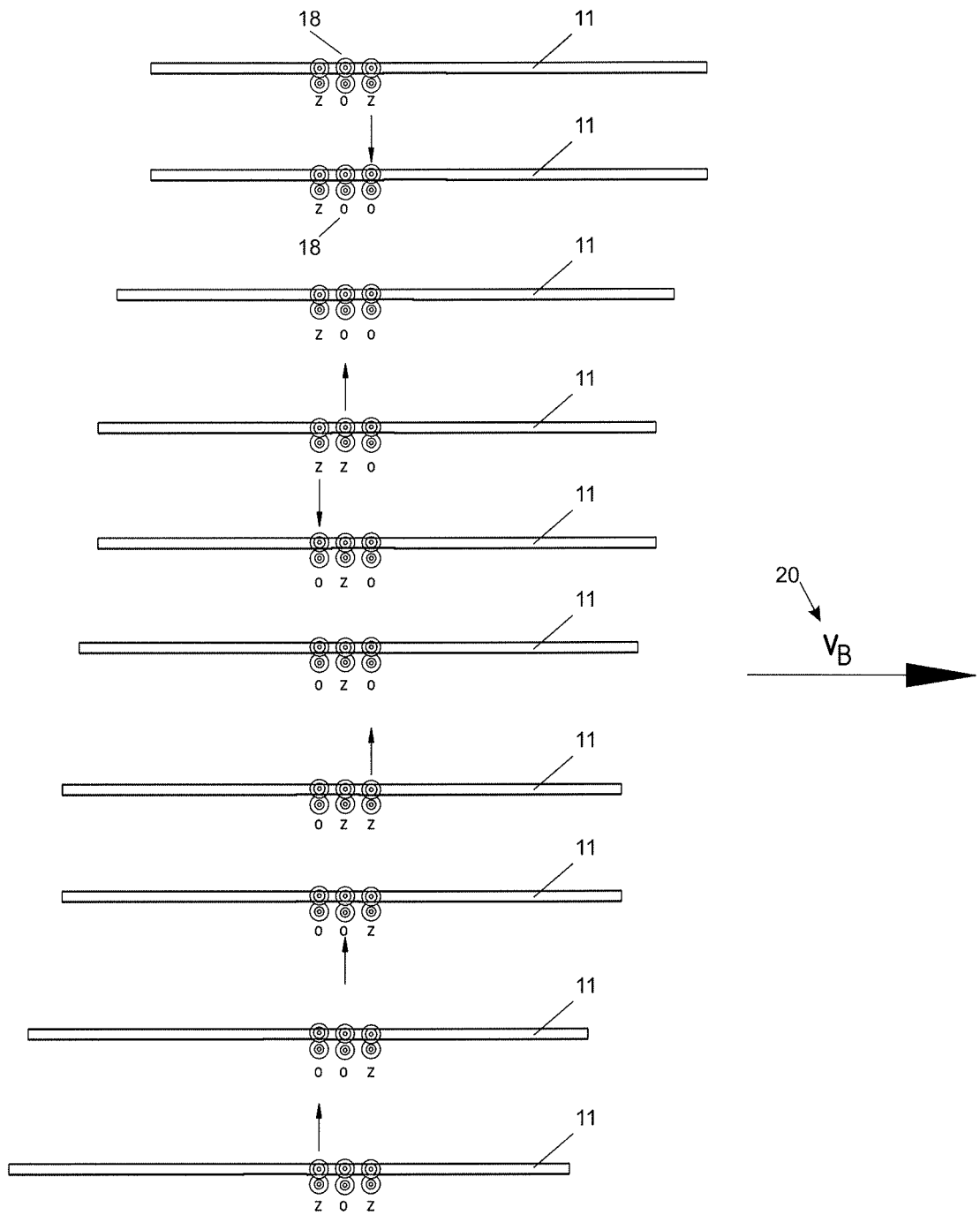

FIG. 10: is a view of the arrangement according to FIG. 9, showing the controlled opening and closing of the guide roller pairs as a function of the swaged region.

Figure 11:
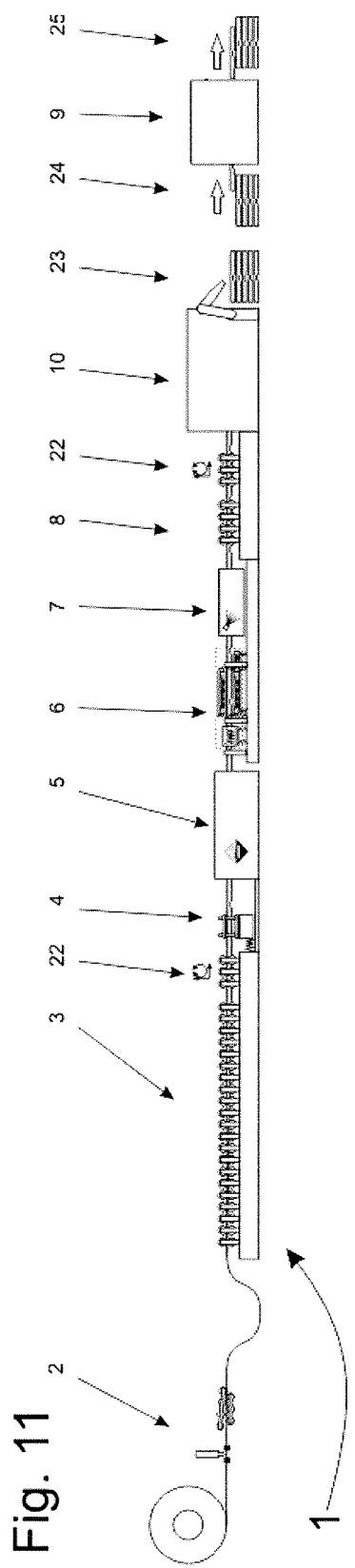

FIG. 11: shows a roller profiling system according to the invention followed by a post-conditioning of the surface in the individual component;

To carry out the method, a roller profiling unit 1 is provided (FIG. 1 and FIG. 11); the systems 1 shown in FIGS. 1 and 11 differ only in the position of the post-conditioning of the surface. According to these figures, the roller profiling unit 1 includes a strip preparation 2, in which steel strip of a suitable width is unwound from a coil and fed into the continuous conveyance of the system 1.

From the strip preparation 2, the steel strip, which has been flat up to this point, travels into a profiling region 3, in which profiling rollers bring the steel strip in an intrinsically known way into a desired, in particular tubular or partially tubular form (for example with a hat-shaped profile (FIG. 2)).

It is advantageous if a first straightening and calibrating unit is already provided at the end of the profiling part of the system.

In order to produce beads, indentations, or imprints, the profiled strip then travels into a region in which floating stamping presses 4 produce the corresponding beads, swages, or indentations.

Then a pre-cleaning takes place in a cleaning station 5.

After the cleaning, the two-stage heating according to the invention is carried out in a corresponding heating station 6; then the strip is quenched in a cooling and quenching unit 7 and also partially hardened as a result.

In the case shown in FIG. 1, the cooling unit 7 is followed by a unit for post-conditioning 9, which can be embodied in the form of a system for airless blast cleaning or injector blast cleaning. In particular, this frees the profile of any build-up caused by the high-temperature process.

In a system according to FIG. 1, this is followed by a tensioning unit 8 and calibration unit 22, with which the strip is kept under tension; particularly in the tensioning unit 8, the strip, which is being guided through the two-stage heating unit 6 and the cooling unit 7, is acted on with a pre-tensioning force, which stretches it slightly.

In the case of FIG. 11, the tensioning unit 8 and calibration unit 22 come directly after the cooling unit 7.

After the tensioning unit 8 and calibration unit 22 in both positions of the post-conditioning, in a last processing step before the sorting 23, comes the length-cutting and perforation station 10; in particular, lasers are used to cut the strip to length and to produce the holes in the components.

In a profiling system 1 according to FIG. 11, the individual components undergo post-conditioning after being cut to length; once again, this post-conditioning station 9 can be embodied using both airless blast cleaning technology and injector blast cleaning technology. If the post-conditioning 9 is not situated immediately adjacent to the profiling system 1 so that the profiles are only sorted and bundled after the post-conditioning 9, then this may require a unit for separating the profiles 24 and then bundling 25 them.

For example, a profile component that is produced with the method according to the invention is hat-shaped in cross-section (FIG. 2). It can, however, also assume other, significantly more complex shapes.

Viewed over its cross-section, this strip and/or profile 11 has hard regions 12 and soft regions 13 (FIG. 2).

These regions can also be distributed over the length of the component so that a hard region 12 extends, for example, only over part of the length of the component.

To this end, according to the method, the entire component is heated in a first heating stage, for example inductively, to a temperature at which the selected steel material has not yet been transformed into an austenitic structure so that a heating of this steel material that is heated in the first stage does not result in a martensitic hardening.

The heating in the first stage thus correspondingly takes place at temperatures of approximately 650° C. to 720° C.; in particular, the preheating can be carried out at temperatures <680° C. In any case, the temperature remains below the austenite starting temperature ($Ac_1$). The steel material used is preferably a steel material or steel strip that is provided with a corrosion-protection coating. For example, the coating is a coating composed of zinc or a zinc alloy; this coating composed of zinc or a zinc alloy remains solid at the temperatures of the first stage, i.e. at these temperatures, this zinc coating alloys with the underlying steel material to form zinc/iron compounds.

Preferably, however, the invention uses a steel material or a steel strip, which already has a zinc/iron alloy coating. Such zinc/iron alloy coatings are also referred to as galvannealing layers and are usually produced by subjecting the steel strip to a temperature treatment after galvanization. A galvannealing coating has the advantage that in the process according to the invention, it has a very good ability to withstand the temperature treatment and is also very rugged and insensitive to the temperature treatment, even with regard to possible waiting times and the like.

Also according to the method, in the second heating stage, only parts of the strip 11 that are to be hardened (hardened regions 12) are selectively heated further so that these regions form an austenitic structure. If these austenitic regions are then cooled together with the non-austenitized regions, a martensitic hardening takes place in the austenitic regions. In particular, the profile is heated to temperatures of 720° C.-920° C. in some regions.

According to the invention, different procedures can be used to heat these regions that are to be hardened.

If the desired components are provided with hardened regions 12 that extend over the entire length of the sheet steel strip 11 or profile 11, then stationary heating units 17 can act on the strip 11 as the strip 11 travels past the stationary heating units.

If only partial lengths of the strip 11 are embodied with hardened regions 12, there are in turn two options, on the one hand stationary heating units 17 that are shielded or switched off in the regions that are not to be hardened or heating units that are conveyed along with the strip 11—possibly at different speeds—and are then moved back to their starting points (floating heating units 17).

A heterogeneous heating of a profile across the cross-section—and possibly also over the length—that is performed in this way usually causes this profile to warp or buckle.

According to the invention, a profile 11 (FIG. 3) is conveyed into a two-stage heating unit 15; for example, the heating unit 15 includes an inductor 16 and burner 17, which act on the profile 11. Naturally, it is also possible to carry out the preheating only with burners 17 (FIG. 3a).

In a preferred embodiment, the burners are embodied in the form of burners that are operated with premixed gas. The term "premixed gas" means that the actual fuel (e.g. natural gas) and air or oxygen are premixed. Burners of this kind that operate with premixed gas permit a very precisely controlled heating. With these burners, temperature control is particularly simple; in regions with different hardnesses in the longitudinal direction of the profile, these burners are preferably used as floating burners so that they do not have to be switched off. Switching off these burners requires flushing with compressed air, which should be avoided. This flushing results in a certain minimum time between operating phases of the burners.

The profile 11 or strip 11 in this case (FIG. 3b) is conveyed with a pair of rollers 18, 19 both before the heating unit 15 and after the heating unit 15; each roller pair has an upper roller 18a, 19a and a lower roller 18b, 19b. The rollers 18, 19 convey the profile 11 preferably at least by means of nonpositive engagement, possibly also by means of both positive and nonpositive engagement.

The tensile force exerted and the stretching introduced—particularly if this stretching is also present during the quench hardening—also prevent a warpage due to martensitic transformation. Because the steel strip exists in different phases after the cooling, a martensitic phase in the hardened regions and preferably a ferritic phase in the softer regions, differences also arise in the respective phase transformations. These are likewise compensated for by the stretching that is exerted. The exerted stretching in this case is therefore advantageous because on the one hand, no warpage or only a slight warpage is produced. This slight warpage or non-existent warpage renders superfluous the straightening of the profiles that is otherwise and conventionally provided. This is particularly important because a subsequent straightening negatively affects the elongation at fracture of the components.

In FIG. 6a, the heating is depicted as being carried out only with burners, without a preheating stage and without the strip tension according to the invention, which results in a buckling of the profile, as shown in FIGS. 6a-A and 6a-B.

In FIG. 6b, the inductor 16 carries out a corresponding preheating; because of the corresponding strip tension, in particular by the tensioning unit 8, the profile 11 remains flat, as shown in FIGS. 6b-A and 6b-B.

Preferably, the guidance of the profile 11 and the exertion of the strip tension (FIGS. 7 through 10) only take place in the non-hardened regions; in the case of impressions in the profile, these must be released. In order to nevertheless keep the profile precisely in position in the heating zone, driven guide units 21 are provided, which do not necessarily have to be driven and which preferably have three roller pairs 21a, 21b, and 21c. The roller pairs 21a, 21b, and 21c can be placed against the strip independently of one another and act, for example, on the flange of a profile 11 (FIG. 8) so that they engage a profile 11 laterally on the flange (FIG. 9) and corresponding guide a corresponding profile 11 in accordance with a movement direction 20.

In this case, the roller pairs 21a, 21b, 21c are embodied so that they act on and guide the profile as a function of certain swaged regions of a profile 11 or the respective roller pairs are pulled apart from each other and define an open space between themselves so that this roller pair at least does not touch the profile on both sides of the strip.

This is particularly important when the swaged regions travel through the roller pair because otherwise, the swaging would be rolled back out again. If such a profile with a swaged region travels through a unit 21, the units 21 with their roller pairs 21a, 21b, 21c are thus successively moved into an open position and back into a closed position in order on the one hand, to reliably guide a profile and on the other, to not cause any unwanted deformation.

In this case, the regions to be heated are in particular heated to 720-920° C., it being possible for the corresponding heating units, as explained above, to also be embodied in floating fashion.

With an inductive heating of the strip, at swaged edges and at cut or stamped edges, a more intense heating by the induction occurs than in the flat regions of the strip.

In order to protect these regions from overheating, according to the invention, in the region of stamped or bent edges, so-called absorption masses are used as needed, which absorb the heat of these regions and equalize it with the remainder of the flat strip.

To this end, correspondingly shaped solid masses are guided through the system along with the strip and after they exit the heating region, are picked up or removed from the strip and cooled as needed before being returned to their starting positions.

With a partial heating by means of burners for hardening purposes, in regions in which the burners act on the region of the component or profile 11 to be hardened in a predominantly horizontal fashion, the burners are guided in an at least uniaxial fashion.

The invention has the advantage that it succeeds in continuously producing roller-formed profiles with partially hardened regions and the continuous process is not negatively influenced by warpage or buckling.

REFERENCE NUMERAL LIST 1 roller profiling unit
2 strip preparation
3 profiling region
4 stamping presses
5 cleaning station
6 heating station
7 quenching unit
8 tensioning unit
9 secondary cleaning station 10 length-cutting and perforation station
11 component/profile/strip
12 hard regions
13 soft regions
14
15 heating unit
16 inductor
17 burner
18 unit
18a upper roller
18b lower roller
18c roller pair
19a upper roller
19b lower roller
20 movement direction
21 unit
21a roller pair
21b roller pair
21c roller pair
22 straightening and calibrating unit

The invention claimed is:

1. A method for continuously roller-forming and hardening sheet steel in which sheet steel is continuously roller-formed into a profile in a roller-profiling unit, wherein after roller-forming, a profile strand is preheated to a temperature below the austenite starting temperature ($Ac_1$) and the profile strand is then heated to a temperature above the austenitic temperature range ($AC_3$) across subregions of its cross-section and/or subregions of its length, with the profile strand being acted on with tension at least during the heating of subregions of the profile strand to a temperature $>AC_3$, whereby the tension is exerted in the subregions of the profile strand that have a temperature below $AC_3$ so that those subregions of the profile strand experience a predetermined amount of lengthening.

2. The method according to claim 1, wherein the tension is exerted on the profile strand with a tensioning unit, with the tension being exerted by rollers that are situated later in a conveying direction.

3. The method according to claim 1, wherein tension is exerted, which results in the predetermined amount of lengthening being a 0.5 to 2% stretching in the regions that are not to be hardened.

4. The method according to claim 1, wherein after the heating of the subregions to the temperature $>AC_3$, the profile strand is cooled at a cooling speed greater than critical hardening speed of the profile strand, which results in hardening of subregions that have been heated to a temperature $>AC_3$.

5. The method according to claim 1, wherein before the heating, the profile strand is provided with swages by floating swaging units.

6. The method according to claim 1, wherein the profile strand is inductively preheated to the temperature below the austenite starting temperature ($Ac_1$).

7. The method according to claim 1, wherein the roller-formed and preheated profile strand is heated to the temperature $>AC_3$ in some regions by means of burners.

8. The method according to claim 1, wherein for the heating of subregions of the profile strand to a temperature above $AC_3$, burners are arranged in stationary fashion or act on the strip, traveling along with it in floating fashion.

9. The method according to claim 1, wherein the profile strand is cut to length and/or provided with holes after hardening.

10. The method according to claim 1, wherein the roller-formed and hardened profile strand is cleaned by means of injector blast cleaning or airless blast cleaning.

11. The method according to claim 1, wherein during preheating and/or austenitization, edges of holes and/or edges of swages are contacted by absorption masses in order to dissipate excess heating in these regions.

12. The method according to claim 1, wherein for the sheet steel, a sheet steel strip is used, which has a corrosion-protection layer based on zinc or a galvannealed corrosion-protection layer composed of a zinc/iron alloy.

13. The method according to claim 1, wherein burners with premixed gas are used to heat the subregions of the profile strand.

14. The method according to claim 1, including floating burners that are able to move in the conveying direction of the profile strand to heat the profile strand as it moves, with the burners being moved along at the speed of the profile strand, traveling faster than the profile strand during the heating or traveling slower than the profile strand during the heating so that axial lengths or partial lengths of the profile strand are heated.

* * * * *